Figure 1:
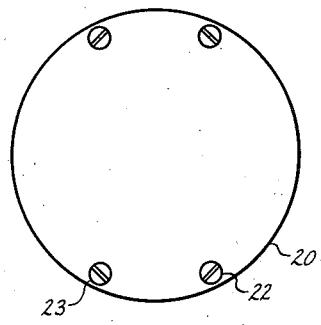

April 13, 1943.    J. D. SCHWARTZ    2,316,631
METHOD OF AND APPARATUS FOR MAKING DENTURES
Filed March 28, 1941    2 Sheets-Sheet 1

INVENTOR.
Jacob D. Schwartz
William B. Jaspert
BY
Attorney.

April 13, 1943.  J. D. SCHWARTZ  2,316,631
METHOD OF AND APPARATUS FOR MAKING DENTURES
Filed March 28, 1941  2 Sheets-Sheet 2

INVENTOR.
Jacob D. Schwartz
BY William B Jaspert
Attorney.

Patented Apr. 13, 1943

2,316,631

UNITED STATES PATENT OFFICE 2,316,631

METHOD OF AND APPARATUS FOR MAKING DENTURES

Jacob D. Schwartz, Pittsburgh, Pa.

Application March 28, 1941, Serial No. 385,616

5 Claims. (Cl. 18—33)

This invention relates to apparatus for and a method of making dentures.

The making of dentures requires painstaking effort to assure a proper fit, the process consisting in the preparation of a waxed-up model which is invested in a flask for making the mold by which the denture of a moldable composition such as rubber or resin is made.

The flasks in general use today are very irregular in form, which makes it difficult to obtain smooth surface finishes and to remove the investment material after use. In preparation of the mold and in the molding operation, the successive steps require separation of the flasks, and to assure proper alignment of the flask sections it has been customary to form the flask of an unsymmetrical shape.

It is among the objects of the present invention to provide a flask for molding and curing dentures which is of cylindrical form to facilitate machining and polishing of the inner faces thereof, and which is of a design to key-in or lock the investment material while permitting ready removal thereof after the denture has been completed.

It is a further object of the invention to provide a method of molding dentures by the employment of an original and modified duplicate cast which compensates for any shrinkage in the resin employed.

Figure 2:
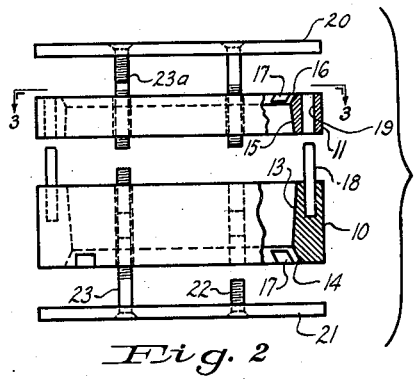
Figure 3:
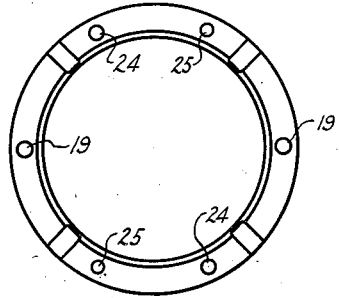
Figure 4:
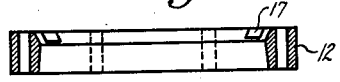
Figure 5:
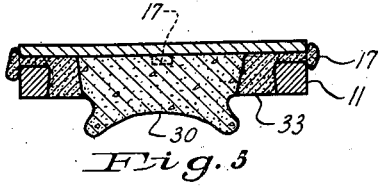
Figure 6:
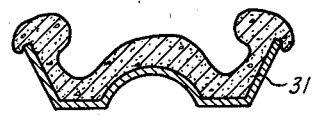
Figure 7:
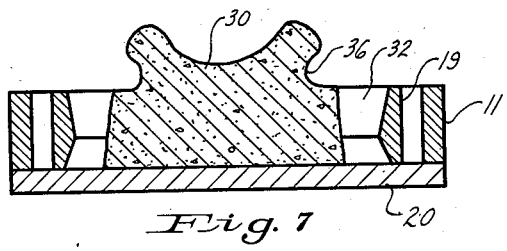
Figure 8:
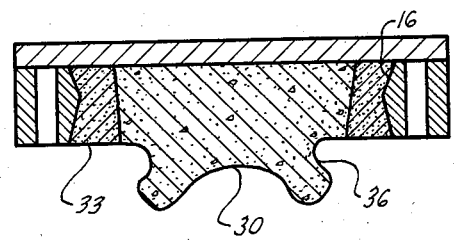
Figure 9:
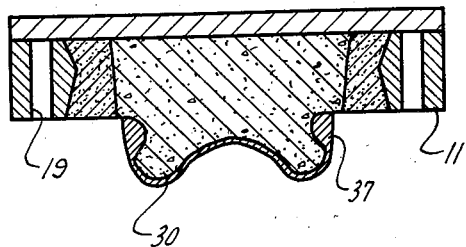
Figure 10:
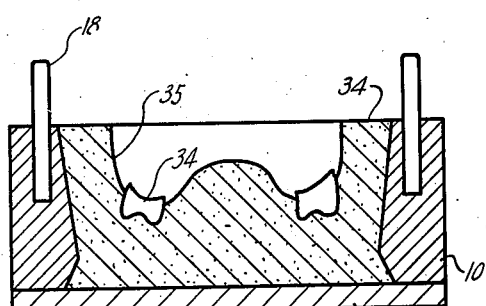
Figure 13:
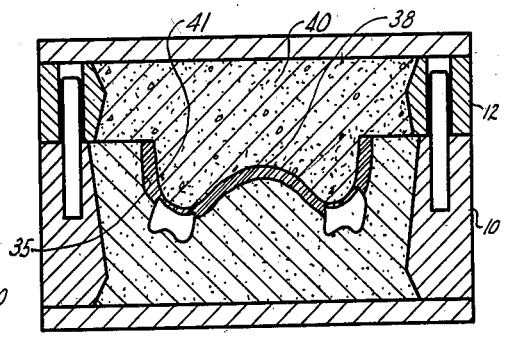
Figure 11:
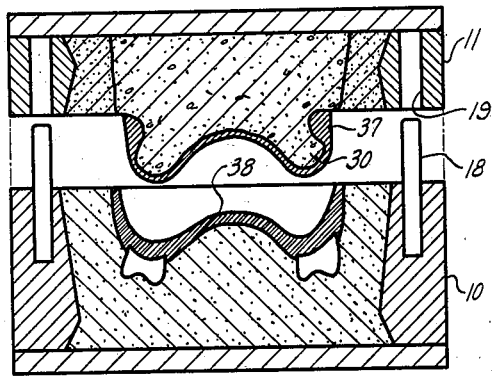
Figure 14:
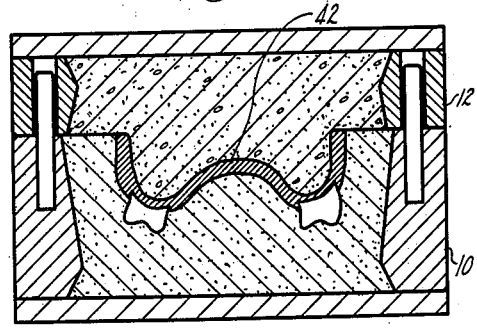
Figure 12:
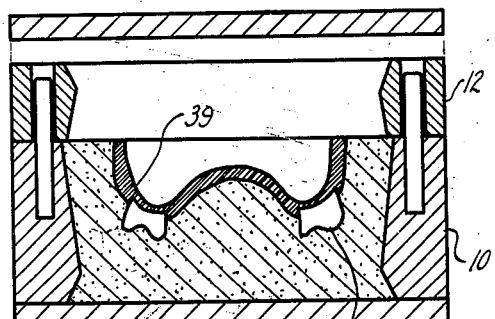
Figure 15:
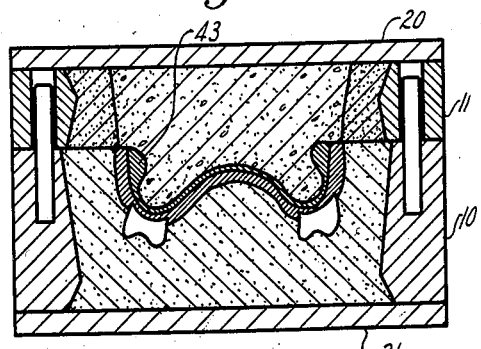
Figure 16:
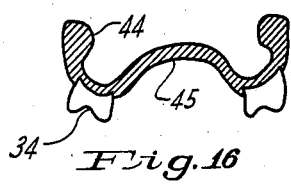

These and other objects of the invention will become more apparent from a consideration of the accompanying drawings in which like reference characters designate like parts and in which:

Fig. 1 is a plan view of a cover plate for a flask embodying the principles of this invention;

Fig. 2 an exploded view of the flask parts embodying this invention;

Fig. 3 a plan view of a flask ring or section;

Fig. 4 a cross-sectional view of a small flask ring;

Fig. 5 a cross-section of a flask section and cast invested therein;

Fig. 6 a cross-section of an impression from which the cast is made;

Fig. 7 an enlarged cross-sectional view of a cast and flask section;

Fig. 8 a similar view of the cast invested in the flask section and inverted to the molding position;

Fig. 9 a cross-sectional view of a cast prepared for a preliminary molding operation;

Fig. 10 a cross-section of the large flask ring with the teeth invested therein;

Fig. 11 an exploded view of a top and bottom flask section ready for the premolding operation;

Fig. 12 a cross-sectional view of a flask assembly and cover plate preparatory to the making of a modified duplicate cast;

Figs. 13, 14 and 15 vertical cross-sectional views of flask assemblies illustrating the method of molding a denture; and Fig. 16 a vertical cross-section taken transversely of the finished denture.

For a better understanding of the molding operations, the flask, cover plates and fastening equipment will first be described in connection with Figs. 1 to 4 of the drawings.

The equipment for carrying out the hereinafter described method employs a large flask section designated by the reference numeral 10, and two small flask sections 11 and 12. The flask sections' exteriors are of cylindrical form and their interiors are tapered walls designated by the numerals 13 and 14 in the large flask section, and 15 and 16 in the small flask sections.

It is to be noted that key slots 17 are provided in the chamfered faces 14 and 16 of the flasks. The object of the tapered inner wall construction of the flask is to key the investment material therein against displacement, the keys being formed in the slots 17 by the flow of the plaster when the cover plate is closed, which after solidification in the slot 17 prevents angular displacement of the investment material.

After use, the investment material is removed by working a knife blade around the chamfered periphery 14 to break away the investment material which at the same time severs the keys in slots 17 and permits the investment material to be pushed out of the flask from the tapered faces 13 and 15.

The large flask section 10 is provided with dowel pins 18 and the smaller flask section with dowel pin openings 19 to maintain proper alignment and register of the mold portions within the flasks.

Cover plates 20 and 21 are attached to either the large or small flask sections or both by short screws 22. Long screws 23 may be used to extend either from the cover plate through the large flask section to engage and draw-up the small flask section, as shown at the bottom of Fig. 2, or through cover plate 20 and through the small flask section 11 to interact with threaded openings in the large flask section 10.

As shown in Fig. 3, the openings 24 are larger than the opening 25 to permit free movement of the screws therein, the smaller openings 25 being threaded screw holes for interacting with the threads of the screws. Because of the annular surfaces of the flask, they can be readily machined and polished by turning in a lathe chuck, or if made of steel they can be ground and polished. The highly polished surfaces facilitate the removal of the investment material after the molding operation.

The flask equipment of Figs. 1 to 4 is employed in carrying out the method of forming dentures in accordance with the present invention, as follows:

A model or cast generally designated by the numeral 30, Fig. 7, is made from an impression 31, Fig. 6, and the cast 30 is placed in a small flask section 11 having a cover plate 20 attached thereto.

The next step is to build up a model on the cast 30 which is waxed-up by building up a body of wax corresponding roughly to the thickness of the finished denture with the teeth 34 supported in the wax.

The cast, together with the waxed-up model, is next invested by placing it in section 11 and filling the space 32, Fig. 7, between the cast and the inner walls of the flask with an investing material such as plaster of Paris 33, Fig. 8. The investment material flows through the key slot 17, as shown in Fig. 5, to anchor the cast against rotary movement and the chamfered face 16 prevents displacement of the cast and investment material axially of the flask.

The large flask section 10 is then placed on the small flask section containing the model and fastened together by the long screws 23a. The large flask section is then filled with investment material. When the plaster is hardened, the flask is heated and separated, and the wax is boiled out, leaving the teeth invested in the plaster 34, as shown in Fig. 10, and leaving a matrix or mold cavity 35.

The cast 30 which has a decided undercut 36 is then prepared by filling the undercut with tin foil 37 or the like as shown in Fig. 9, the foil being shown as covering the entire surface of the cast. The matrix 35 is then coated with wax 38, Fig. 11, and the small flask section 11 containing modified cast is placed over the dowel pins 18 of the large flask ring 10. The cast is pressed into the wax or other plastic substance 38 to form the impression designated by the numeral 39, Fig. 12. The flask section 11 in which the cast 30 is invested is then removed and the other small flask ring 12 is placed on the large flask ring 10 and fastened together by the long screws 23, Fig. 2, as shown in Fig. 12.

The impression 39 and flask ring 12 are then filled with investment material, as shown in Fig. 13, to form a modified duplicate cast or molding plunger 40 in which the molding surface is not undercut, as shown at 41.

After the material is set, the flask is separated and the wax 38 is boiled out.

If the flask were then again assembled, there would be a space between the plunger surface and the mold 35 corresponding to the thickness of the denture. This space is filled with a molding composition such as rubber or plastic such as a synthetic resin 42, and the flask sections 10 and 12 are again assembled and placed in a press, the contacting faces of the flask sections being properly and solidly seated without the use of the long screws.

The assembly is then subjected to heat to harden the molding composition 42 and the flask is then again separated with the denture remaining in the large flask section 10.

The denture, as shown in Fig. 14, is not undercut as shown at 36 in the cast 30, and would on that account not fit the jaws for which it is made; also because all molding compositions have some degree of shrinkage, the denture would not be of the exact size of the model. To overcome this difficulty prevalent in all conventional methods of making dentures, additional molding compositions designated by the numeral 43 is placed on the denture, as shown in Fig. 15.

The original cast 30, having the foil 37 thereon, invested in the flask section 11 is then used for the final molding step by first removing the filling material or foil 37 to expose the undercut 36, the flask section 11 being placed upon the large flask section 10 with the cover plates 20 and 21, as shown in Fig. 15 and placed in a press. The assembly is then again subjected to a molding pressure and curing temperature to cause the added material 43 to set around the original cast 30 to produce the full-size undercut denture, as shown in cross-section in Fig. 16 in which the undercuts 36 of the cast 30 have formed the inwardly extending portions 44 of the denture, the denture which is generally designated by the numeral 45 being of the proper thickness and of the proper contour to firmly seat in the mouth with substantially uniform contact of its over-all surface area.

By making the mold 35 of Fig. 10 as described, that is, by placing the flask section 11 over the dowel pins, proper register of the mold parts is maintained at all times.

I have found in actual use that the employment of flasks, as herein shown, greatly facilitates the making of dentures and that if made of a non-corroding metal such as brass, the inner surfaces and contacting faces of the flask can be kept smooth and polished. By means of the chamfered ends for anchoring the investment materials, the investment can be readily removed by merely scraping it away from the chamfered portion, it being readily broken-out of the key slots and then removed by pressing it out of the flask ring.

Although one embodiment of the invention has been herein illustrated and described, it will be evident to those skilled in the art that various modifications may be made in the details of construction without departing from the principles herein set forth.

I claim:

1. The method of molding dentures which comprises forming a cast from an original impression, coating said cast with wax for supporting the teeth thereon, investing the model thus formed in a sectional flask to form a mold, separating the flask parts and removing the wax, leaving the teeth embedded in the matrix of the mold, coating the matrix with a layer of impression material of substantially the thickness of the denture, replacing the flask parts with the original cast modified to shape the impression material, replacing the flask section in which the original cast is invested with another flask section, filling said last named section and impression with plaster to form a duplicate cast, removing the impression material and charging the mold with a plastic material, molding and curing the plastic using the duplicate cast, separating the flask sections, adding more plastic material and molding and curing the same with the unmodified original cast and removing the finished denture from the flask.

2. The steps in the method of making dentures of moldable substances which consists of molding and curing the denture to substantially the finished dimensions and shape, adding more moldable substance to make up for shrinkage in the original molding step and subjecting the added material to a molding and curing operation to form an integral full size denture.

3. The steps in the method of molding dentures of moldable materials which consists of forming an original and a modified duplicate cast and molding and curing the denture first with the modified duplicate cast, adding more moldable material and finish-molding and curing the denture with the original cast.

4. A flask for molding dentures comprising a plurality of flask sections, each section having contiguous annular inner faces chamfered outwardly in opposite directions for locking the investment material therein.

5. A flask for molding dentures comprising a plurality of cylindrical flask sections, each section having contiguous annular inner faces and having one end of the section chamfered outwardly to retain the investment material therein, said sections having key slots for receiving investment material to prevent angular displacement of said material in the flask.

JACOB D. SCHWARTZ.